(12) United States Patent
Ochiai

(10) Patent No.: US 10,609,913 B2
(45) Date of Patent: Apr. 7, 2020

(54) LINE ROLLER

(71) Applicant: Shimano Inc., Sakai, Osaka (JP)

(72) Inventor: Koji Ochiai, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 16/171,916

(22) Filed: Oct. 26, 2018

(65) Prior Publication Data

US 2019/0191681 A1 Jun. 27, 2019

(30) Foreign Application Priority Data

Dec. 22, 2017 (JP) ................. 2017-246821

(51) Int. Cl.
*A01K 89/01* (2006.01)

(52) U.S. Cl.
CPC .............. *A01K 89/01082* (2015.05)

(58) Field of Classification Search
CPC ........ A01K 89/0108; A01K 89/011221; A01K 89/011223
See application file for complete search history.

(56) References Cited

U.S. PATENT DOCUMENTS

| 2004/0124298 A1* | 7/2004 | Okada | A01K 89/0108 242/231 |
| 2006/0027691 A1* | 2/2006 | Ochiai | A01K 89/0108 242/231 |
| 2012/0048981 A1* | 3/2012 | Ohara | A01K 89/0108 242/230 |
| 2015/0216155 A1* | 8/2015 | Matsuda | A01K 89/0108 242/321 |
| 2017/0164593 A1* | 6/2017 | Ochiai | A01K 89/01122 |
| 2017/0181419 A1* | 6/2017 | Ochiai | A01K 89/01122 |

FOREIGN PATENT DOCUMENTS

JP 2550173 Y2 6/1997

* cited by examiner

*Primary Examiner* — Emmanuel M Marcelo
(74) *Attorney, Agent, or Firm* — Global IP Counselors, LLP

(57) ABSTRACT

A line roller for guiding a fishing line to a spool of a spinning reel for fishing includes a cylindrical guide member, a cylindrical bushing, a bearing and a rotation regulating part. The cylindrical guide member includes a guide surface configured to guide the fishing line on an outer circumferential surface thereof. The cylindrical bushing supports the inner circumferential surface of the guide member. The bearing includes an inner race, an outer race supporting the inner circumferential surface of the bushing, and a rolling element disposed between the inner race and the outer race, and rotatably supporting the bushing with respect to the base member. The rotation regulating part regulates relative rotation between the guide member and the bushing by being disposed on one of either the inner circumferential surface of the guide member or the outer circumferential surface of the bushing and contacting the other surface.

12 Claims, 8 Drawing Sheets

LEFT ←——→ RIGHT

LINE ROLLER

CROSS-REFERENCE TO RELATED APPLICATIONS

This application claims priority to Japanese Patent Application No. 2017-246821, filed on Dec. 22, 2017. The entire disclosure of Japanese Patent Application No. 2017-246821 is hereby incorporated herein by reference.

BACKGROUND

Field of the Invention

The present invention relates to a line roller for a spinning reel for fishing.

Background Art

Spinning reels for fishing generally comprise a spool, a rotor having a pair of rotor arms, and a bail arm pivotably mounted on a distal end portion of the pair of rotor arms. The bail arm is a mechanism for guiding a fishing line onto the spool. Bail arms comprise a bail, a pair of bail support members that support the two ends of the bail, and a line roller.

The line roller disclosed in Japanese Utility Model Registration No. 2550173 comprises a cylindrical guide member (line guide roller 6) that has a guide surface for guiding the fishing line on the outer circumferential surface, a cylindrical bushing (collar 7) that has an outer circumferential surface for supporting the inner circumferential surface of the guide member, and a bearing (ball bearing 11) which includes an inner race attached to a base member, an outer race supporting the inner circumferential surface of the bushing, and rolling elements disposed between the inner race and the outer race, and which rotatably supports the bushing with respect to the base member.

In the line roller disclosed in Japanese Utility Model Registration No. 2550173 the bushing is press-fitted into the guide member so that the guide member does not rotate relative to the bushing. However, there are cases in which the bushing and the guide member rotate relatively due to dimensioning errors, etc., between the bushing and the guide member, and scrape against each other generating squeaking noises.

SUMMARY

An object of the present invention is to provide a line roller that prevents squeaking.

In the line roller according to the present invention, the line roller (for example, line rollers 100, 100P, 100Q, 100R, 100S) guide fishing line to a spool of a spinning reel for fishing, and comprises a cylindrical guide member, a cylindrical bushing, a bearing, and a rotation regulation part. The cylindrical guide member (for example, guide member 160) comprises a guide surface for guiding the fishing line on an outer circumferential surface. The cylindrical bushing (for example, bushing 140) includes an outer circumferential surface supporting and inner circumferential surface of the guide member. The bearing (for example, first bearing 111 and second bearing 115) includes an inner race (for example, inner races 111A, 115A) attached to a base member (for example, base member 15D), an outer race (for example, outer races 111B, 115B) supporting the inner circumferential surface of the bushing, and rolling elements (for example, rolling elements 111C, 115C) disposed between the inner race and the outer race, the bearing rotatably supporting the bushing with respect to the base member. The rotation regulating part (for example, first O-ring 151, second O-ring 155, elastic protrusion 151Q, elastic protrusion 155Q, engagement protrusion 152S, engagement protrusion 156S) is disposed on one of either the inner circumferential surface of the guide member or the outer circumferential surface of the bushing (a first surface) and contacts the other surface (a second surface), thereby regulating the relative rotation between the guide member and the bushing.

The rotation regulating part can comprise one or more elastic bodies (for example, the first O-ring 151, the second O-ring 155, the elastic protrusion 151Q, the elastic protrusion 155Q) disposed on the first surface and that contacts with the second surface.

The elastic body can be attached to the first surface (for example, fitted into a groove 141AA, etc., such as with the first O-ring 151, or integrally formed with the bushing 140, such as with the elastic protrusion 151Q).

The first surface can include a recess (for example, the grooves 141AA, 145AA, 164PA, 164PB, 141U, 145U, 168UA, 168UB) that accommodates the elastic body.

The second surface can include a circumferential surface (for example, a surface on which the recess such as the groove is not provided, such as the inner circumferential surface of the guide member 160) with which the elastic body makes elastic contact.

The elastic body can be the O-ring (for example, the first O-ring 151, the second O-ring 155).

The elastic body can be the elastic protrusion (for example, the elastic protrusion 151Q, the elastic protrusion 155Q) that protrudes from the first surface.

The second surface can include a recess (for example, a recess 165QA, a recess 165QB) into which the elastic protrusion enters.

The rotation regulating part can include the engagement protrusion (for example, the engagement protrusion 152S, the engagement protrusion 156S) that protrudes from the first surface, the second surface can include an engagement recess (for example, engagement recess 167SA, engagement recess 167SB) into which the engagement protrusion enters and that engages the engagement protrusion, and the relative rotation between the guide member and the bushing can be regulated by engagement of the engagement protrusion with the engagement recess.

The engagement protrusion and the engagement recess can extend in the direction of the rotational axis (for example, axis C) of the bushing.

A second rotation regulating part disposed on the second surface and contacts the second surface, thereby regulating the relative rotation between the guide member and the bushing can be further provided (refer to FIGS. 6, 7).

A configuration that is the same as any of the configurations described above (however, the "one" and the "other" are reversed) can be employed as the configuration relating to the above-described second rotation regulating part.

The guide member can include an engagement portion (for example, a protrusion 162), and the bushing can include an engaged portion (for example, groove H) that restricts the guide member and the bushing from becoming misaligned in the direction of the rotational axis of the bushing by engaging the engagement portion.

According to the present invention, it is possible to regulate the relative rotation between the guide member and the bushing, which causes squeaking, with the rotation regulating part, and to thereby prevent the squeaking.

BRIEF DESCRIPTION OF THE DRAWINGS

FIG. 2 is a cross-sectional view of a line roller and the like.

DETAILED DESCRIPTION OF THE EMBODIMENTS

A line roller 100 according to an embodiment of the present invention, as well as a spinning reel 10 for fishing having the line roller 100, will be described below, with reference to the drawings. In the following description, including the modified examples, the same members, equivalent members, and corresponding members are denoted by the same reference symbols.

Schematic Configuration of the Spinning Reel

Figure 1:
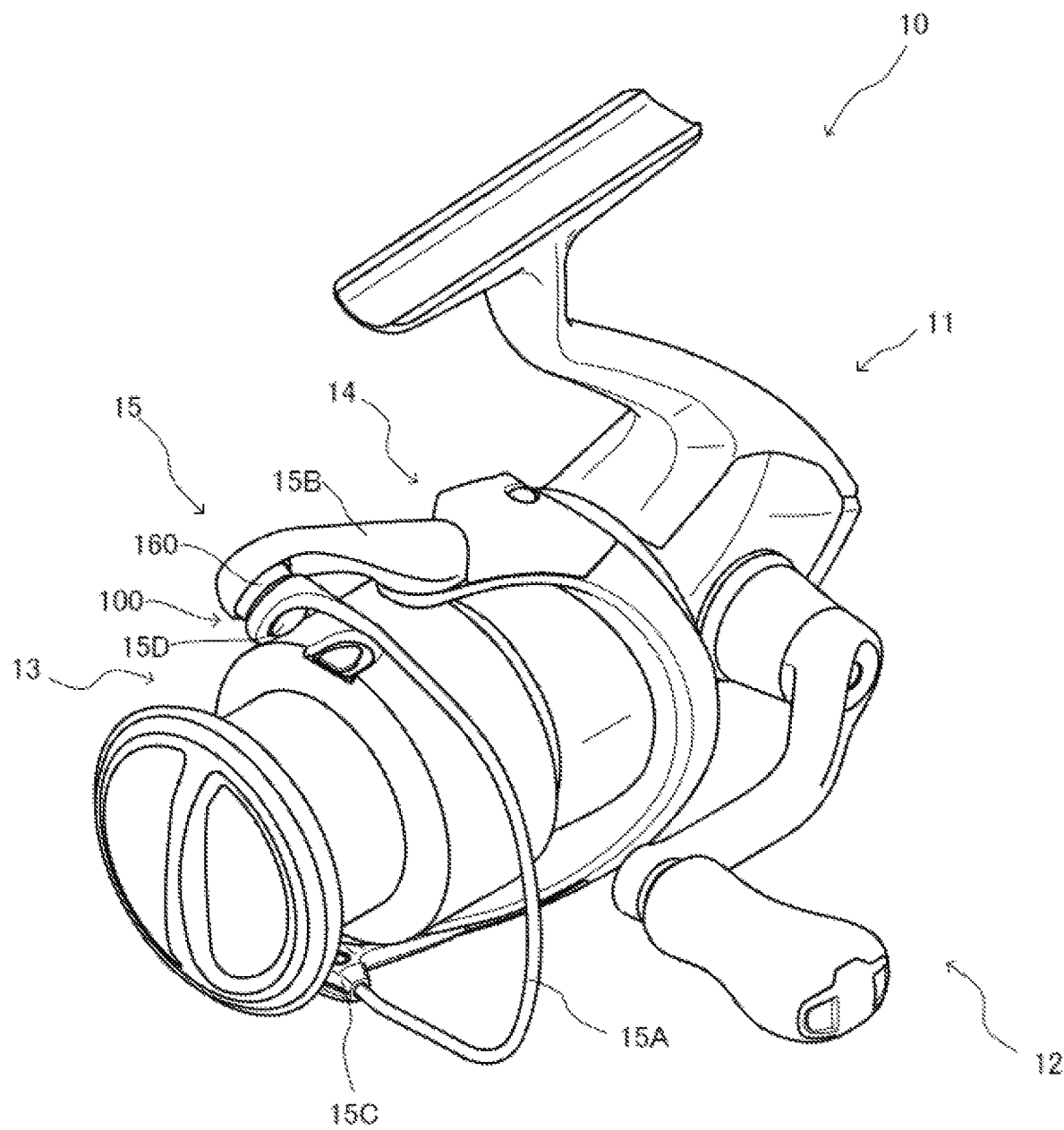
FIG. 1 is an overall view of a spinning reel for fishing according to an embodiment of the present invention.

As shown in FIG. 1, etc., the spinning reel 10 comprises a reel body 11, a handle 12, a spool 13, a rotor 14, and a bail arm 15.

The reel body 11 comprises a drive mechanism that rotates the rotor 14 relative to the reel body 11 in conjunction with the rotation of the handle 12 and that moves the spool 13 relative to the reel body 11 in the direction of the rotational axis of the rotor 14. A fishing line is wound around the spool 13.

The bail arm 15 is attached to the rotor 14 and rotates relative to the reel body 11 together with the rotor 14. The bail arm 15 is attached to the rotor 14 so as to be pivotable between a line-winding position for winding the fishing line around the spool 13 and a line-releasing position for casting (unreeling) the fishing line from the spool 13.

The bail arm 15 includes a bail 15A, a first bail support member 15B, a second bail support member 15C, a base member 15D, a bolt 15E (FIG. 2), and a line roller 100. The first bail support member 15B and the second bail support member 15C support the bail 15A, which is attached to the rotor 14 and guides the fishing line. The line roller 100 is fixed between one end of the bail 15A and the first bail support member 15B by the base member 15D and the bolt 15E. The line roller 100 guides the fishing line, which is wound around the spool 13, when the bail arm 15 is in the line-winding position. The line roller 100, the base member 15D, and the bolt member 15E will be described further below.

Line Roller

Figure 2:
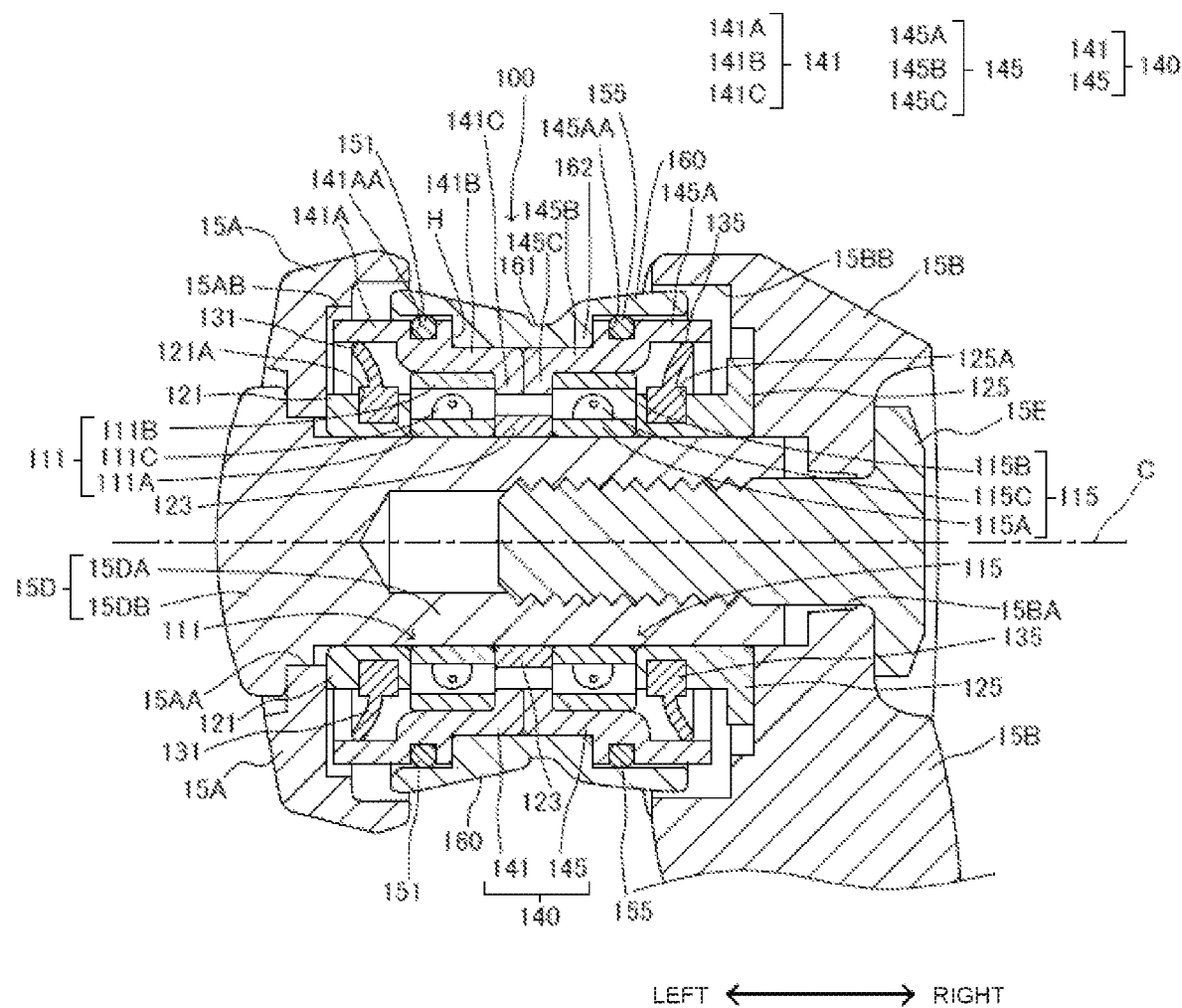

As shown in FIG. 2, the line roller 100 comprises a first bearing 111, a second bearing 115, a first spacer 121, a second spacer 123, a third spacer 125, a first seal member 131, a second seal member 135, a bushing 140, a first O-ring 151, a second O-ring 155, and a guide member 160. In the following descriptions, the left-right direction as shown in FIG. 2 is referred to as left and right.

The line roller 100 is attached to the base member 15D. The base member 15D passes through a through-hole 15AA disposed at one end of the bail 15A. The base member 15D is a collar member that includes a cylindrical female-threaded portion 15DA that has an outer circumferential surface to which the line roller 100 is attached, and a flange 15DB that projects out from the female-threaded portion 15DA to prevent the base member from falling out in the right direction of FIG. 2. The base member 15D is screwed with the bolt 15E by the female-threaded portion 15DA. The bolt 15E passes through a through-hole 15BA disposed in the bail support member 15B. The line roller 100 is sandwiched and fixed between the bail 15A and the bail support member 15B by screwing the bolt 15E into the female-threaded portion 15DA (tightening between the flange 15DB and the bolt 15E). The bail 15A includes a housing recess 15AB for housing a left-end portion of the line roller 100. The first bail support member 15B includes a housing recess 15BB for housing a right-end portion of the line roller 100.

The C axis in FIG. 2 is a center axis of the bolt 15E, and is also a rotational axis (also the center axis) of the bushing 140 as well as of the guide member 160 of the line roller 100.

The first bearing 111 rotatably supports the bushing 140, and the like, with respect to the base member 15D. The first bearing 111 comprises an inner race 111A, an outer race 111B, and rolling elements 111C. The inner race 111A is fitted to the outer circumferential surface of the base member 15D (the female-threaded portion 15DA), and the outer race 111B is fitted to a first bushing member 141, described further below, of the bushing 140. The rolling elements 111C are disposed between the inner race 111A and the outer race 111B, and rotatably support the outer race 111B. The rolling elements 111C roll at the time of relative rotation between the inner race 111A and the outer race 111B such that the relative rotation is smooth. Here, the rolling elements 111C are spherical but may also be cylindrical (the same applies to the rolling elements 115C, described further below).

The second bearing 115 rotatably supports the bushing 140, and the like, with respect to the base member 15D. The second bearing 115 comprises an inner race 115A, an outer race 115B, and rolling elements 115C. The inner race 115A is fitted to the outer circumferential surface of the base member 15D (the female-threaded portion 15DA) and the outer race 115B is fitted to a second bushing member 145, described further below, of the bushing 140. The rolling elements 115C are disposed between the inner race 115A and the outer race 115B and rotatably support the outer race 115B. The rolling elements 115C roll at the time of relative rotation between the inner race 115A and the outer race 115B such that the relative rotation is smooth.

The first spacer 121, the second spacer 123, and the third spacer 125 hold (position) the first bearing 111 and the second bearing 115 in desired positions. The first spacer 121 is a cylindrical member and is sandwiched between the first bearing 111 and the bail 15A. The second spacer 123 is a cylindrical member and is sandwiched between the first bearing 111 and the second bearing 115. The third spacer 125 is a cylindrical member and is sandwiched between the second bearing 115 and the bail support member 15B. The first spacer 121, the second spacer 123, and the third spacer 125 are fitted to the outer circumferential surface of the base member 15D.

The outer circumferential surface of the first spacer 121 has an annular groove 121A that extends circumferentially. An annular first seal member 131 is fitted into the groove 121A. The outer circumferential surface of the third spacer 125 has an annular groove 125A that extends circumferentially. An annular second seal member 135 is fitted in the groove 125A.

The first seal member 131 and the second seal member 135 have an annular shape and are elastic bodies, such as bodies made of rubber. The distal end (outer circumferential side) of the first seal member 131 contacts, or is proximate to, the inner circumferential surface of a cylindrical portion 141A of the first bushing member 141, described further below, and seals the space between the first spacer 121 and the cylindrical portion 141A. The distal end (outer circumferential side) of the second seal member 135 contacts, or is proximate to, the inner circumferential surface of a cylindrical portion 145A of the second bushing member 145, described further below, and seals the space between the second bushing member 145 and the cylindrical portion 145A. As a result, the housing space that houses the first bearing 111 and the second bearing 115 is hermetically sealed and protected from water, and the like.

The bushing 140 is a cylindrical member (e.g., a cylindrical bushing) positioned inside the guide member 160 and has an outer circumferential surface for supporting the guide member 160. The bushing 140 includes the first bushing member 141 and the second bushing member 145, which are divided in two along the C axis direction.

The first bushing member 141 includes the cylindrical portion 141A having a cylindrical shape, a cylindrical portion 141B having a cylindrical shape, and a flange 141C. The outer circumferential surface of the cylindrical portion 141A includes an annular groove 141AA that extends circumferentially. The first O-ring 151 is fitted into the groove 141AA. The cylindrical portion 141B is positioned farther inward than the cylindrical portion 141A. The cylindrical portion 141B is connected to the right-end portion of the cylindrical portion 141A and extends toward the second bushing member 145. The cylindrical portion 141B is fitted to the outer race 111B of the first bearing 111. The flange 141C protrudes inwardly from the right-end portion of the cylindrical portion 141B.

The second bushing member 145 includes the cylindrical portion 145A having a cylindrical shape, a cylindrical portion 145B having a cylindrical shape, and a flange 145C. The outer circumferential surface of the cylindrical portion 145A includes an annular groove 145AA that extends circumferentially. The second O-ring 155 is fitted into the groove 145AA. The cylindrical portion 145B is positioned farther inward than the cylindrical portion 145A. The cylindrical portion 145B is connected to the left-end portion of the cylindrical portion 145A and extends toward the first bushing member 141. The cylindrical portion 145B is fitted to the outer race 115B of the second bearing 115. The flange 145C protrudes inward from the left-end portion of the cylindrical portion 145B.

The right end surface of the first bushing member 141 (that is, an end surface of the cylindrical portion 141B and an end surface of the flange 141C) and the left end surface of the second bushing member 145 (that is, an end surface of the cylindrical surface 145B and an end surface of the flange 145C) abut each other. The flange 141C and the flange 145C constitute one toroidal plate by abutting each other. The flange 141C and the flange 145C enter between the first bearing 111 and the second bearing 115 and engage with the outer race 111B and the outer race 115B thereof. The movement of the bushing 140 in the direction of the C axis is regulated by this engagement.

A step is provided on the first bushing member 141 by the cylindrical portion 141A and the cylindrical portion 141B, and a step is provided on the second bushing member 145 by the cylindrical portion 145A and the cylindrical portion 145B. By abutting the end surface of the first bushing member 141 and the end surface of the second bushing member 145 with each other, the two steps form the annular groove H positioned in the center of the bushing 140 in the C axis direction. That is, the outer circumferential surface of the bushing 140 includes the groove H.

The first O-ring 151 and the second O-ring 155 are elastic bodies, such as bodies made of rubber. The first O-ring 151 is fitted into the groove 141AA, protrudes farther on the outer circumferential side than the outer circumferential surface of the cylindrical portion 141A, and is in elastic contact (in contact in an elastically deformed state) with the inner circumferential surface of the guide member 160. The second O-ring 155 is fitted into the groove 145AA, protrudes farther on the outer circumferential side than the outer circumferential surface of the cylindrical portion 145A, and is in elastic contact with the inner circumferential surface of the guide member 160. The first O-ring 151 and the second O-ring 155 press (bias) the inner circumferential surface of the guide member 160 by elastic deformation.

The guide member 160 is cylindrical (e.g., a cylindrical guide member) and has a guide surface 161 on the outer circumferential side that guides the fishing line, which is wound around the spool 13, when the bail arm 15 is in the line-winding position. The guide member 160 has an annular protrusion 162 on the inner circumferential side that protrudes inward. The protrusion 162 enters the groove H of the bushing 140 and engages the groove H. The movement of the guide member 160 in the direction of the C axis is regulated by the engagement. The two inner circumferential surfaces of the guide member 160 sandwiching the protrusion 162 in the C axis direction oppose the outer circumferential surface of the bushing 140, specifically the outer circumferential surface of the cylindrical portion 141A and the outer circumferential surface of the cylindrical portion 145A, with spaces therebetween. The inner circumferential surfaces described above are pressed by the first O-ring 151 and the second O-ring 155 that are disposed on the outer circumferential surface of the bushing 140 (specifically, fitted into the grooves 141AA and 145AA). The first O-ring 151 and the second O-ring 155 thereby support the guide member 160. In other words, the outer circumferential surface of the bushing 140 supports the guide member 160 via the first O-ring 151 and the second O-ring 155. The first O-ring 151 and the second O-ring 155 are in elastic contact with the guide member 160 and thus acts as rotation regulation parts by restricting the rotation of the guide member 160 relative to the bushing 140 by friction.

Operation of the Line Roller

The base member 15D is immovable relative to the bail 15A. The inner race 111A of the first bearing 111, the inner race 115A of the second bearing 115, the first spacer 121, the second spacer 123, and the third spacer 125, which are fitted to the outer circumferential surface of the base member 15D do not rotate relative to the base member 15D. On the other hand, the first bushing member 141 is fitted to the outer race 111B that is rotatable relative to the inner race 111A of the first bearing 111. Furthermore, the second bushing member 145 is fitted to the outer race 115B that is rotatable relative to the inner race 115A of the second bearing 115. Thus, the first bushing member 141 and the second bushing member 145 (that is, the bushing 140) are rotatable relative to the base member 15D and the like, together with the outer races 111B and 115B. Since the bushing 140 supports the guide member 160 via the first O-ring 151 and the second O-ring 155, the bushing 140, the first O-ring 151, the second O-ring 155, and the guide member 160 are integrally rotatable with the base member 15D and the like, together with the outer races 111B and 115B.

When the bail arm 15 is in the line-winding position, the fishing line is guided by the line roller 100 and wound around the spool 13. The guidance is carried out by the guide surface 161 of the guide member 160. At the time of the guidance, the fishing line applies torque to the guide member 160 due to friction with the guide surface 161. The guide member 160 is rotatable relative to the base member 15D together with the bushing 140, and the like, and thus can be smoothly rotated by the above-described torque. The line roller 100 can thus smoothly guide the fishing line.

Assembly, etc., of the Line Roller

First, the base member 15D is passed through the through-hole 15AA of the bail 15A from the left side. The first spacer 121 to which the first seal member 131 is attached, the first bearing 111, and the second spacer 123 are then fitted to the base member 15D in this order from the right. Thereafter, the first bushing member 141 to which the first O-ring 151 is attached is fitted to the first bearing 111. Next, the guide member 160 is attached to the first bushing member 141. The guide member 160 is moved from right to left against the friction force that is generated between the first O-ring 151 and the inner circumferential surface of the guide member 160 and attached to the first bushing member 141. Thereafter, the second bearing 115, to which is fitted the second bushing member 145, to which is attached the second O-ring 155, is fitted to the base member 15D. At this time, the second bearing 115, to which is fitted the second bushing member 145, is moved to the left side against the friction force that is generated between the second O-ring 155 and the inner circumferential surface of the guide member 160. The third spacer 125, to which is attached the second seal member 135, is then fitted to the base member 15D. Thereafter, the bolt 15E is screwed into the base member 15D via the through-hole 15BA disposed in the bail support member 15B. The line roller 100 is provided by the method described above.

Effects of the Present Embodiment

If the bushing 140 is press-fitted to the guide member 160, as in the prior art, there are situations in which the guide member 160 rotates relative to the bushing 140 due to dimensioning errors, and the two elements scrape against each other and produce squeaking. However, in the present embodiment, the relative rotation of the guide member 150 with respect to the bushing 140 is regulated by the first O-ring 151 and the second O-ring 155. This is because the first O-ring 151 and the second O-ring 155, which are fitted in the groove 141AA and the groove 145AA of the bushing 140, frictionally contact the inner circumferential surface of the guide member 160. Accordingly, it is possible to prevent the relative rotation between the guide member 160 and the bushing 140 and to prevent squeaking with the regulation of the relative rotation by the first O-ring 151 and the second O-ring 155.

Additionally, in the present embodiment, since a portion of the first O-ring 151 is housed in the groove 141AA of the bushing 140 by the fitting described above, and a portion of the second O-ring 155 is also housed in the groove 145AA of the bushing 140 by the fitting described above, it is possible to prevent misalignment between the first O-ring 151 and the second O-ring 155.

Additionally, in the present embodiment, the rattling caused by dimensioning errors, etc., of the guide member 160 is prevented by the elastic contact of the first O-ring 151 and the second O-ring 155 with the inner circumferential surface of the guide member 160. In particular, the first O-ring 151 and the second O-ring 155 are arranged separably along the C axis direction (direction of the center axis of the guide member 160) and are disposed across the protrusion 162 or the center of the guide member 160 in the C axis direction; the guide member 160 is thereby supported in a well-balanced manner. In addition, the guide member 160 is also supported in a well-balanced manner because each of the first O-ring 151 and the second O-ring 155 is disposed farther on the end portion side of the guide member 160 than the center in the C axis direction. This embodiment is superior in that it is possible to prevent both the squeaking and the rattling described above.

In the present embodiment, when the bushing 140 and the guide member 160 are assembled in the assembly step of the line roller 100, the guide member 160 is attached to the first bushing member 141 against the friction force that is generated between the first O-ring 151 and the inner circumferential surface of the guide member 160. Here, by employing the first O-ring 151, the area of contact between the first O-ring 151 and the guide member 160 will not become unnecessarily large (for example, the contact area will be large if cylindrically shaped rubber is used), nor does the friction force become unnecessarily high; therefore, it is a simple matter to attach the guide member 160. The same also applies to the second O-ring 155.

In addition, by engaging the protrusion 162 of the guide member 160 with the groove H of the bushing 140 it is possible to prevent the movement off the guide member 160 in the direction of the C axis. In addition, because the groove H of the bushing 140 is formed by abutting the first bushing member 141 and the second bushing member 145 with each other, the protrusion 162 of the guide member 160 can be easily inserted into the groove H by sandwiching the protrusion 162 between the first bushing member 141 and the second bushing member 145. Accordingly, it is possible to easily form a structure that prevents movement of the guide member 160 in the C axis direction.

MODIFIED EXAMPLES

The present invention is not limited to the embodiment described above. For example, the shape, etc., of each member described above may be different than that described above. In addition, various modifications of the above-described embodiment are possible. Modified examples are shown below, and at least portions of these modified examples may be combined as well.

Modified Example 1

In the above-described embodiment, the first O-ring 151 and the second O-ring 155 are disposed on the outer circumferential surface of the bushing 140, but at least one of these elements may be disposed on the inner circumferential surface of the guide member 160. For example, as in line roller 100P shown in FIG. 3, the first O-ring 151 may be fitted into an annular groove 164PA disposed on the inner circumferential surface of the guide member 160 and brought into contact with the outer circumferential surface of the bushing 140. Similarly, the second O-ring 155 may be fitted into an annular groove 164PB disposed in the inner circumferential surface of the guide member 160 and brought into contact with the outer circumferential surface of the bushing 140.

Modified Example 2

In the above-described embodiment, the first O-ring 151 and the second O-ring 155 are employed as the regulating parts that regulate the relative rotation of the guide member 160 with respect to the bushing 140; however, instead of or in addition to these elements, a protrusion may be disposed on one of the inner circumferential surface of the guide member 160 and the outer circumferential surface of the bushing 140, and a recess disposed in the other surface, so that the relative rotation between the guide member 160 and the bushing 140 can be regulated by engaging the protrusion and the recess.

Figure 4:
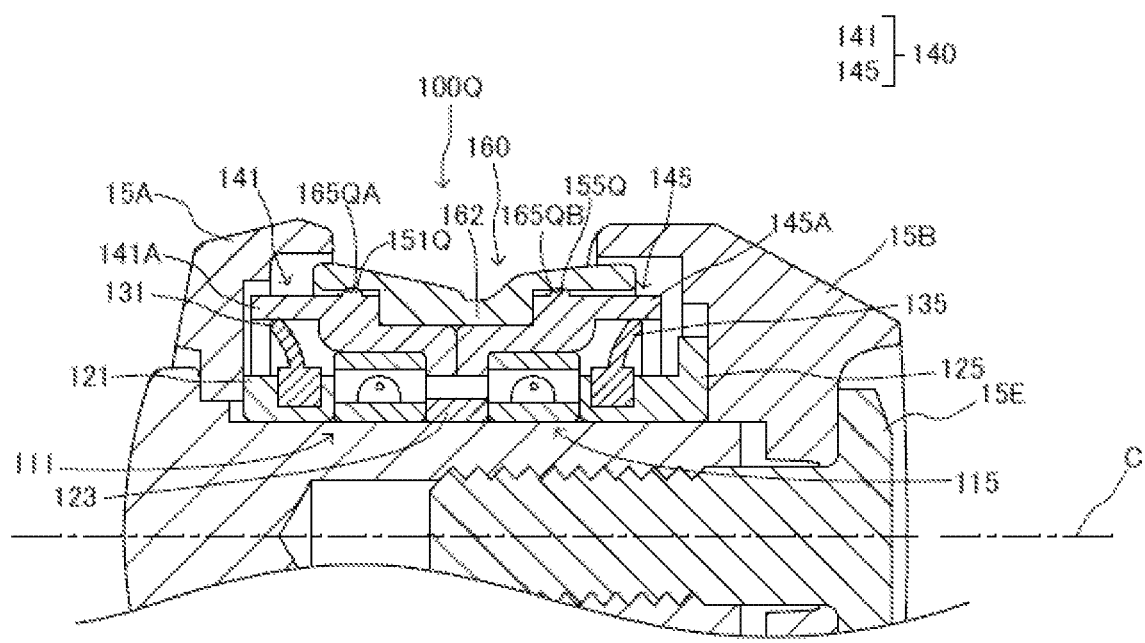
FIG. 4 is a cross-sectional view of the line roller and the like, according to a modified example.

For example, as in line roller 100Q shown in FIG. 4, the first bushing member 141 and an elastic protrusion 151Q are integrally formed from resin or the like. The elastic protrusion 151Q protrudes from the outer circumferential surface of the first bushing member 141 (cylindrical portion 141A). Similarly, the second bushing member 145 and an elastic protrusion 155Q are integrally formed from resin or the like. Thus, the elastic protrusion 155Q protrudes from the outer circumferential surface of the second bushing member 145 (cylindrical portion 145A). It is sufficient if the elastic protrusion 151Q and the elastic protrusion 155Q exhibit elasticity and are hemispherical. In addition, preferably a plurality (preferably, three or more) of the elastic protrusions 151Q are provided in the circumferential direction. Preferably, a plurality (preferably, three or more) of the elastic protrusions 155Q are also provided in the circumferential direction. For example, three elastic protrusions 151Q can be disposed at equal 120-degree intervals, and three elastic protrusions 155Q can be disposed at equal 120-degree intervals. Also, the inner circumferential surface of the guide member 160 can have a recess 165QA, into and with which the elastic protrusion 151Q enters and engages, and a recess 165QB, into and with which the elastic protrusion 155Q enters and engages. The relative rotation of the guide member 160 is regulated by the friction or catching of the elastic protrusion 151Q and the recess 165QA and the friction or catching of the elastic protrusion 155Q and the recess 165QB. Thus, in this manner, the elastic protrusion 151Q and the elastic protrusion 155Q can act as rotational regulation parts. The above-described squeaking can also be prevented with this structure. The elastic protrusion 151Q and the elastic protrusion 155Q are preferably brought into elastic contact to increase the friction force. As a result, the above-described squeaking can be more reliably prevented, and the above-described rattling can also be prevented. The elastic protrusion 151Q and the elastic protrusion 155Q may be annular or arcuate. The recess 165QA and the recess 165QB may be larger than is shown in FIG. 4, and the inner circumferential surface of the guide member 160 (specifically, the two inner circumferential surfaces on both sides of the protrusion 162 in the C axis direction) and the outer circumferential surface of the bushing 140 (specifically, the outer circumferential surface of the cylindrical portion 141A and the outer circumferential surface of the cylindrical portion 141A) can be brought into contact.

Figure 5:
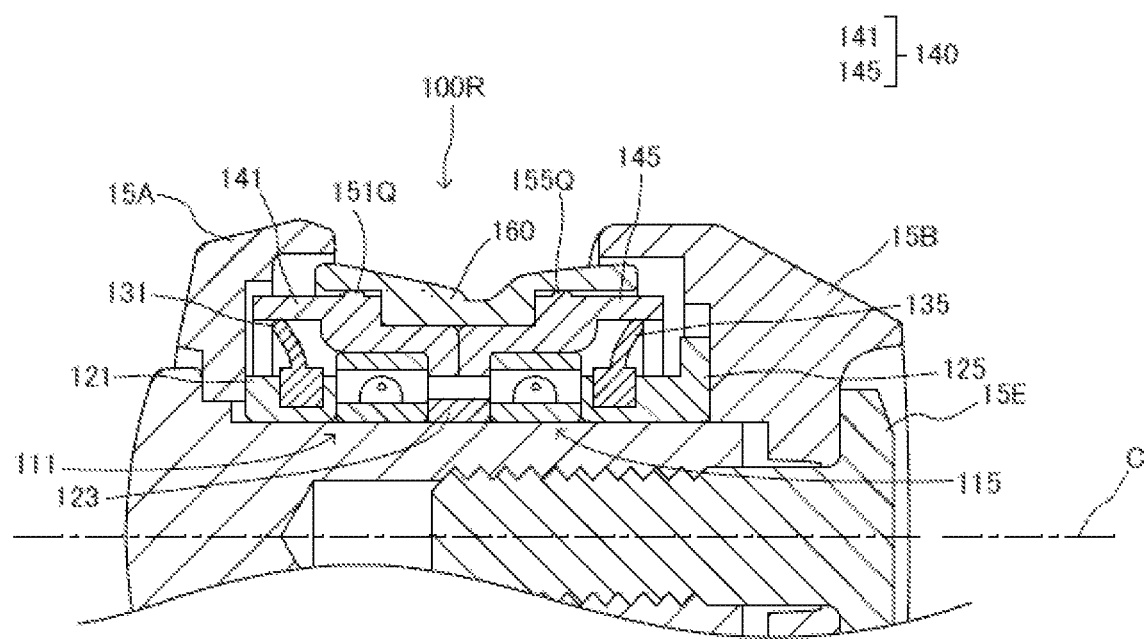
FIG. 5 is a cross-sectional view of the line roller and the like, according to a modified example.

The configuration can be such that the recess 165QA and the recess 165QB are not provided, as in the line roller 100R of FIG. 5.

Figure 6:
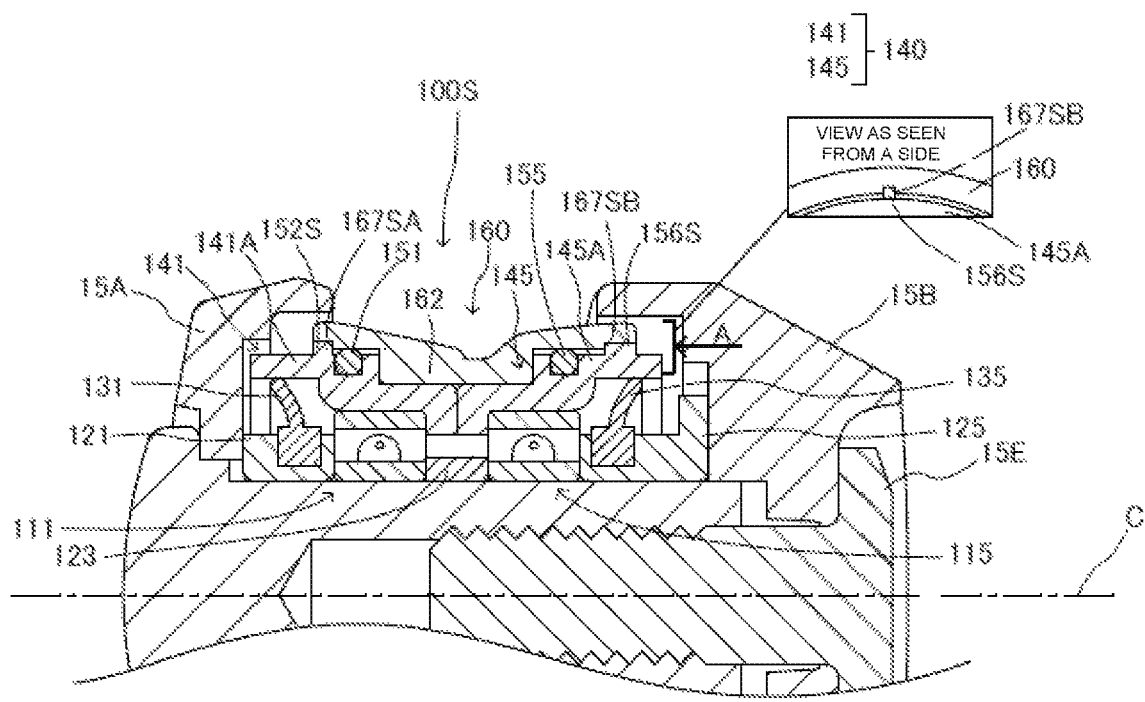
FIG. 6 is a cross-sectional view of the line roller and the like, according to a modified example.

Furthermore, as another example of the protrusion and the recess described above, as in the line roller 100S of FIG. 6, for example, a rectangular parallelepiped engagement recess 152S can be disposed in the outer circumferential surface of the first bushing member 141, and a rectangular parallelepiped engagement protrusion 156S can be disposed on the outer circumferential surface of the second bushing member 145. The inner circumferential surface of the guide member 160 can then have an engagement recess 167SA and an engagement recess 167SB, into and with which the engagement protrusion 152S and the engagement protrusion 156S, respectively, enter and engage. As a result, when the guide member 160 tries to rotate relative to the bushing 140, the engagement protrusion 152S and the engagement protrusion 156S are respectively caught on the inner walls of the engagement recess 167SA and the engagement recess 167SB, and the relative rotation is reliably regulated. Thus, in this manner, the engagement protrusion 152S and the engagement protrusion 156S can act as rotation regulation parts. As a result, the squeaking caused by the relative rotation can be more reliably prevented. It is also possible not to provide the first O-ring 151 and the second O-ring 155, but this embodiment is inferior to embodiments in which these elements are provided in terms of preventing rattling. When the first O-ring 151 and the second O-ring 155 are not provided, the inner circumferential surface of the guide member 160 (specifically, the two inner circumferential surfaces on both sides of the protrusion 162 in the C axis direction) and the outer circumferential surface of the bushing 140 (specifically, the outer circumferential surface of the cylindrical portion 141A and the outer circumferential surface of the cylindrical portion 141A) can be brought into contact. It is sufficient if the engagement protrusion 152S and the engagement protrusion 156S have shapes that extend along the C axis, that is, shapes that are elongated in the C axis direction. In the embodiment shown in FIG. 6, the movement of the guide member 160 in the C axis direction is regulated by the engagement between the engagement protrusion 152S and the engagement recess 167SA, and between the engagement protrusion 156S and the engagement recess 167SB. Thus, it is not necessary to provide the protrusion 162, etc., of the guide member 160.

Figure 3:
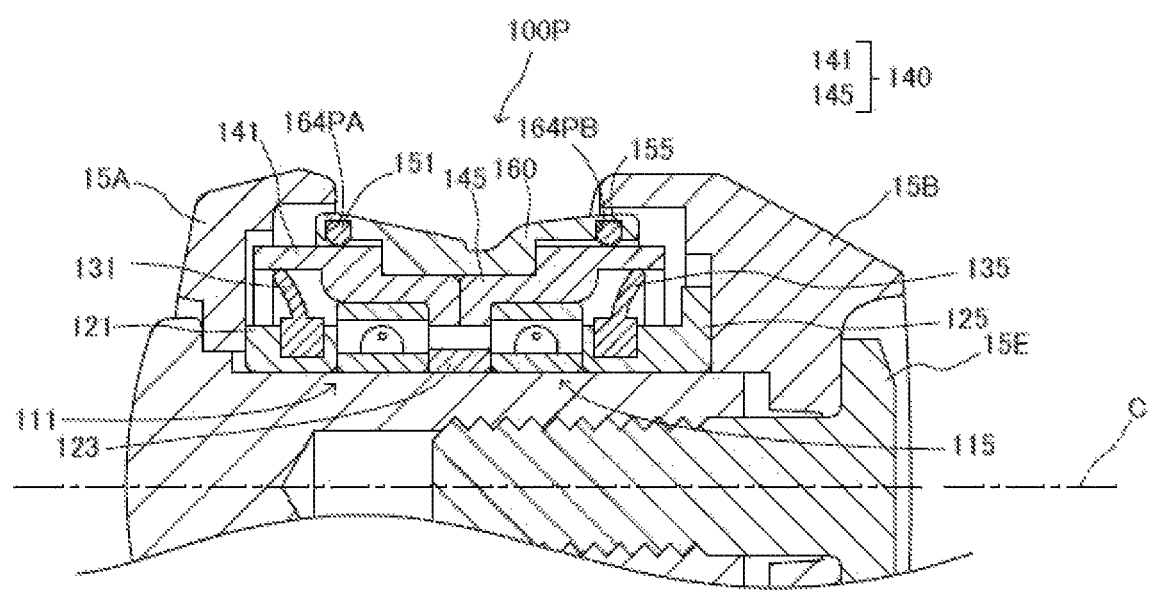
FIG. 3 is a cross-sectional view of the line roller and the like, according to a modified example.
Figure 7:
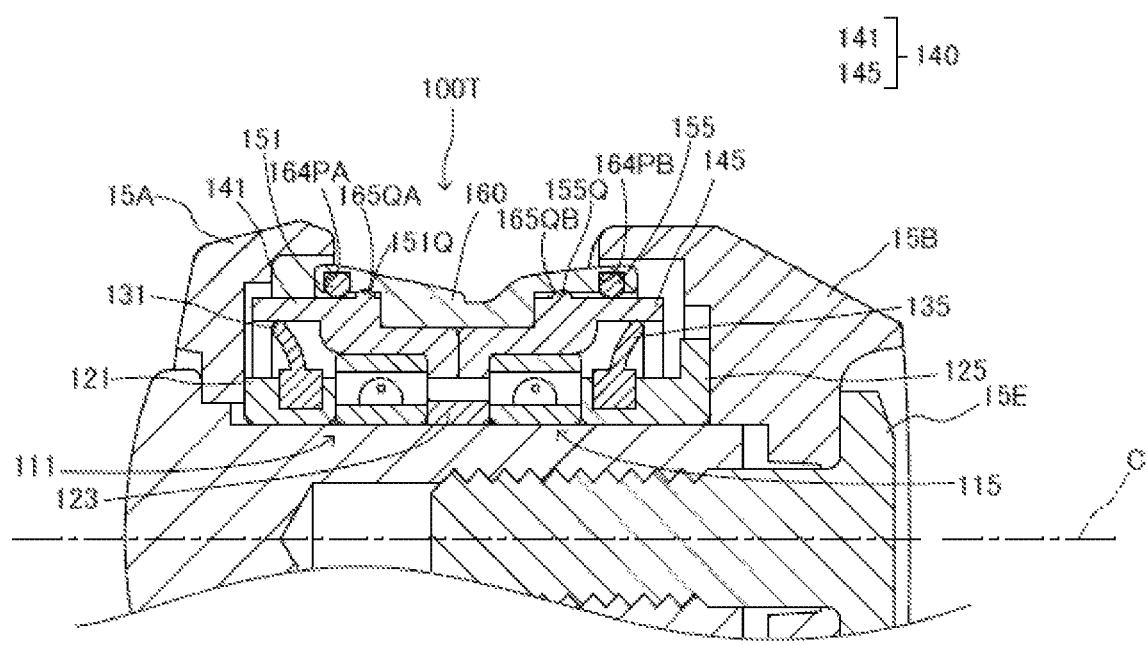
FIG. 7 is a cross-sectional view of the line roller and the like, according to a modified example.

As in a line roller 100T of FIG. 7, the elastic protrusion 151Q, the elastic protrusion 155Q, the recess 165QA, and the recess 165QB of FIG. 4 can be provided in addition to the first O-ring 151 and the second O-ring 155 of FIG. 3. It is thereby possible to more reliably prevent the relative rotation between the guide member 160 and the bushing 140.

One regulating part from among a regulating part A1 composed of the first O-ring 151 and the second O-ring 155, a regulating part A2 composed of the elastic protrusion 151Q and the elastic protrusion 155Q, and a regulating part A3 composed of the engagement protrusion 152S and the engagement protrusion 156S can be employed, or a plurality of the regulating parts can be employed. When a plurality of the regulating parts is employed, all of the regulating parts thereof can be disposed on the inner circumferential surface of the guide member 160 or the outer circumferential surface of the bushing 140 (for example, the configuration of FIG. 6), or part of the plurality of the regulating parts can be disposed on the inner circumferential surface of the guide member 160 and the remainder disposed on the outer circumferential surface of the bushing 140 (for example, the configuration of FIG. 7). The plurality of regulating parts that is disposed on the same surface, from among the outer circumferential surface and the inner circumferential surface described above, can be regarded overall as one regulating part. The number of members that constitute the regulating parts A1 to A3 can be one, or three or more. For example, the regulating part A1 can be composed of one O-ring or three or more O-rings. For example, the regulating part A3 can be composed of only the engagement protrusion 156S.

Figure 8:
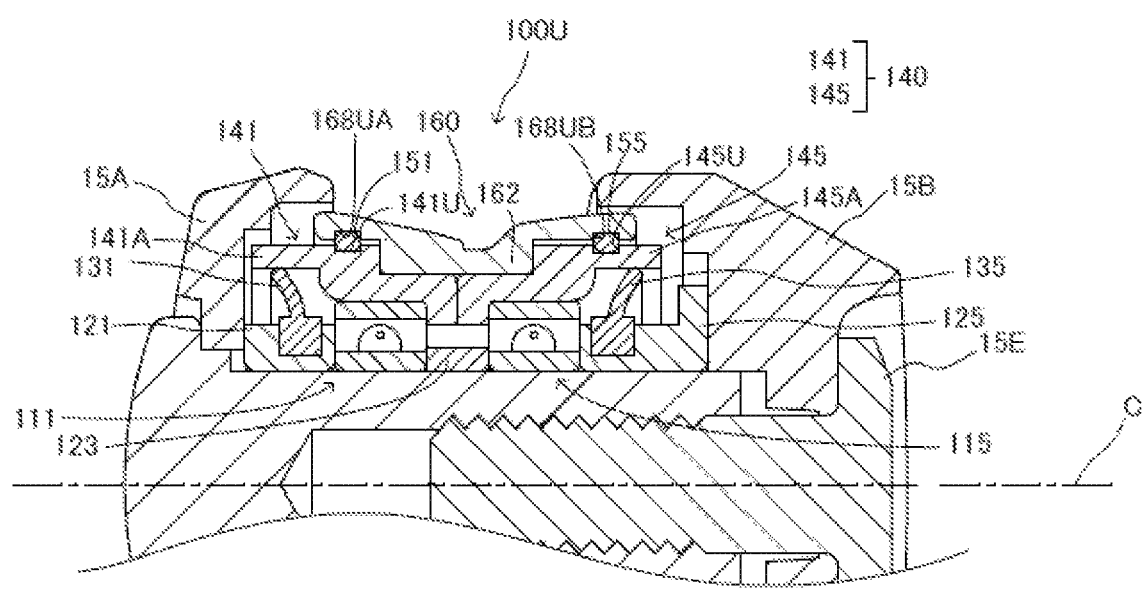
FIG. 8 is a cross-sectional view of the line roller and the like, according to a modified example.

The first O-ring 151 and the second O-ring 155, etc., can be sandwiched between the inner circumferential surface of the guide member 160 and the outer circumferential surface of the bushing 140. Even in such a case, the first O-ring 151 and the second O-ring 155 are provided on one of the inner circumferential surface and the outer circumferential surface, and contact the other surface. For example, as in a line roller 100U of FIG. 8, the inner circumferential surface of the guide member 160 (specifically, the two inner circumferential surfaces on both sides of the protrusion 162 in the C axis direction) includes a groove 168UA and a groove 168UB, and the outer circumferential surface of the bushing 140 (specifically, each of the outer circumferential surface of the cylindrical portion 141A and the of the cylindrical portion 141A) includes a groove 141U and a groove 145U. A portion of the first O-ring 151 is fitted into one of the groove 168UA and the groove 141U, the other portion of the first O-ring 151 is inserted into the other groove, and the other portion is brought into contact with the inner wall surface of the other groove. Thus, the groove 168UA and the groove 141U house the first O-ring 151. A portion of the second O-ring 155 is fitted into one of the groove 168UB and the groove 145U, the other portion of the second O-ring 155 is inserted into the other groove, and the other portion is brought into contact with the inner wall surface of the other groove. Thus, the groove 168UB and the groove 145U house the second O-ring 155.

The mode of the regulating part that regulates the relative rotation of the guide member 160 with respect to the bushing 140 can be another mode. For example, an arcuate elastic body, a tubular elastic body, or the like can be employed instead of the first O-ring 151 and the second O-ring 155.

Modified Example 3

The first seal member 131 and the second seal member 135 can be changed to another sealing mechanism, such as a magnetic sealing mechanism.

Modified Example 4

It is sufficient if the mechanism with which the movement of the guide member 160 in the C axis direction is regulated is achieved by an engagement portion on the guide member 160 and an engaged portion (may be a protrusion, etc.) that engages with the engagement portion on the bushing 140, and the forms, etc., thereof are arbitrary. For example, the engagement portion may be a recess or a groove, and the engaged portion may be a protrusion.

What is claimed is:

1. A line roller for guiding a fishing line to a spool of a spinning reel for fishing, comprising:
    a cylindrical guide member having an outer circumferential surface and an inner circumferential surface, and comprising a guide surface configured to guide the fishing line on the outer circumferential surface;
    a cylindrical bushing having an outer circumferential surface supporting the inner circumferential surface of the guide member;
    a bearing including an inner race attached to a base member, an outer race supporting the inner circumferential surface of the bushing, and a rolling element disposed between the inner race and the outer race, and rotatably supporting the bushing with respect to the base member; and
    a rotation regulating part configured to regulate relative rotation between the guide member and the bushing by being disposed on one of either the inner circumferential surface of the guide member or the outer circumferential surface of the bushing and contacting the other of the inner circumferential surface of the guide member or the outer circumferential surface of the bushing, the rotation regulating part providing a frictional force to prevent relative rotation between the guide member and the bushing.

2. A line roller for guiding a fishing line to a spool of a spinning reel for fishing, comprising:
    a cylindrical guide member having an outer circumferential surface and an inner circumferential surface, and comprising a guide surface configured to guide the fishing line on the outer circumferential surface;
    a cylindrical bushing having an outer circumferential surface supporting the inner circumferential surface of the guide member;
    a bearing including an inner race attached to a base member, an outer race supporting the inner circumferential surface of the bushing, and a rolling element disposed between the inner race and the outer race, and rotatably supporting the bushing with respect to the base member; and
    a rotation regulating part configured to regulate relative rotation between the guide member and the bushing by being disposed on one of either the inner circumferential surface of the guide member or the outer circumferential surface of the bushing and contacting the other of the inner circumferential surface of the guide member or the outer circumferential surface of the bushing, the rotation regulating part comprising one or more elastic bodies disposed on the one of either the inner circumferential surface of the guide member or the outer circumferential surface of the bushing and contacts the other of the inner circumferential surface of the guide member or the outer circumferential surface of the bushing.

3. The line roller according to claim 2, wherein the elastic body is attached to the one of either the inner circumferential surface of the guide member or the outer circumferential surface of the bushing.

4. The line roller according to claim 2, wherein the one of either the inner circumferential surface of the guide member or the outer circumferential surface of the bushing includes a recess that houses the elastic body.

5. The line roller according to claim 2, wherein the elastic body elastically contacts the other of the inner circumferential surface of the guide member or the outer circumferential surface of the bushing.

6. The line roller according to claim 2, wherein the elastic body is an O-ring.

7. The line roller according to claim 2, wherein the elastic body is an elastic protrusion that protrudes from the one of either the inner circumferential surface of the guide member or the outer circumferential surface of the bushing.

8. The line roller according to claim 7, wherein the other of the inner circumferential surface of the guide member or the outer circumferential surface of the bushing includes a recess into which the elastic protrusion is configured to enter.

9. The line roller according to claim 2, wherein the line roller further comprises
    a second rotation regulating part configured to regulate the relative rotation between the guide member and the bushing by being disposed on the other of the inner circumferential surface of the guide member or the outer circumferential surface of the bushing and contacting the one of either the inner circumferential surface of the guide member or the outer circumferential surface of the bushing.

10. The line roller according to claim 1, wherein the rotation regulating part includes an engagement protrusion that protrudes from the one of either the inner circumferential surface of the guide member or the outer circumferential surface of the bushing,
- the other of the inner circumferential surface of the guide member or the outer circumferential surface of the bushing includes an engagement recess in which the engagement protrusion is configured to enter and with which the engagement protrusion is configured to engage, and
- the relative rotation between the guide member and the bushing is regulated by the engagement of the engagement protrusion with the engagement recess.

11. The line roller according to claim 10, wherein
- the engagement protrusion and the engagement recess extend in a direction of a rotational axis of the bushing.

12. The line roller according to claim 1, wherein
- the guide member includes an engagement portion, and
- the bushing includes an engaged portion configured to restrict the guide member and the bushing from becoming misaligned in the direction of the rotational axis of the bushing by engagement with the engagement portion.

* * * * *